United States Patent

Hozumi et al.

[11] Patent Number: 6,084,048
[45] Date of Patent: Jul. 4, 2000

[54] PROPYLENE-1-BUTENE COPOLYMER

[75] Inventors: Hidetake Hozumi, Chiba, Japan; Yasuhito Ijichi, New York, N.Y.

[73] Assignee: Sumitomo Chemical Company, Ltd., Osaka, Japan

[21] Appl. No.: 08/970,799

[22] Filed: Nov. 14, 1997

[30]  Foreign Application Priority Data

Nov. 15, 1996  [JP]  Japan ..................................... 8-304514

[51] Int. Cl.$^7$ ...................................................... C08F 10/08
[52] U.S. Cl. ...................... 526/348.6; 526/348; 526/133; 526/151; 526/153; 526/160; 502/103; 502/114; 525/240
[58] Field of Search .................. 526/348.6, 348, 526/133, 151, 153, 160; 502/103, 114; 525/240

[56]  References Cited

U.S. PATENT DOCUMENTS

| | | |
|---|---|---|
| 2,918,457 | 12/1959 | Jezl . |
| 4,168,361 | 9/1979 | Oda et al. ............................. 526/348.6 |
| 5,681,913 | 10/1997 | Sustic ................................... 526/348.6 |
| 5,700,750 | 12/1997 | Tsutsui et al. .......................... 502/117 |

FOREIGN PATENT DOCUMENTS

| | | |
|---|---|---|
| 54085293 | 6/1979 | European Pat. Off. . |
| 0 842 939 | 5/1998 | European Pat. Off. . |
| 50-38787 | 4/1975 | Japan . |
| 53-79984 | 7/1978 | Japan . |
| 54-85293 | 7/1979 | Japan . |
| 60-38414 | 2/1985 | Japan . |
| 62-119212 | 5/1987 | Japan . |
| 62-119213 | 5/1987 | Japan . |
| 7-42367 | 5/1995 | Japan . |
| 8-12719 | 1/1996 | Japan . |
| 97/1691 | 11/1997 | Japan . |

OTHER PUBLICATIONS

Elias, H.G, Macromolecules 1, Structure and Properties, Second Ed. (1988), Plenum Press, (New York).

Patent Abstracts of Japan, vol. 3, No. 109 (C–58), Sep. 12, 1979, JP 54–85293 A (Mitsui Sekiyu Kagaku Kogyo K. K.).

*Primary Examiner*—Bernard Lipman
*Assistant Examiner*—Caixia Lu-Rutt
*Attorney, Agent, or Firm*—Pillsbury Madison & Sutro LLP

[57]  ABSTRACT

A propylene-1-butene copolymer wherein a Shore A-scale hardness measured according to ASTM D2240 is not more than 70 and an intrinsic viscosity [η] measured in axylene solvent at the temperature of 70° C. is not less than 0.3 and which shows no crystalline melting peak and no crystallization peak in differential scanning calorimeter (DSC) mesurement.

14 Claims, No Drawings

PROPYLENE-1-BUTENE COPOLYMER

BACKGROUND OF THE INVENTION

1. Field of the Invention

The present invention relates to a propylene-1-butene copolymer, and a thermoplastic resin composition. More particularly, it relates to a novel propylene-1-butene copolymer which gives a thermoplastic resin composition having excellent flexibility, tensile elongation characteristics, scratch resistance and transparency when mixing with a resin such as polypropylene, and a thermoplastic resin composition containing said propylene-1-butene copolymer and a polyolefin resin.

2. Description of the Related Art

The propylene-1-butene copolymer is used in melt molded articles (e.g. film, sheet, etc.) as a soft or semirigid resin material which is superior in transparency, surface non-tackiness, tensile characteristics, etc. It is blended with a resin such as polypropylene, etc., and is also used for improvement of heat sealability, impact resistance, etc., widely.

U.S. Pat. No. 2,918,457 discloses a propylene-1-butene copolymer produced by using titanium trichloride. Since the propylene-1-butene copolymer has high hardness, when using the propylene-1-butene copolymer for modification of polypropylene, it is effective for improvement of heat sealbility, impact resistance, etc., but the flexibility, tensile elongation characteristics and scratch resistance are not improved. Since the propylene-1-butene copolymer contains a low-molecular weight component, there also arose a problem that tackiness is remained on the surface of a molded article.

Japanese Patent Kokai Publication Nos. 53-79984, 54-85293, 60-38414, 62-119212 an 62-119213 disclose a propylene-1-butene copolymer containing no low-molecular weight component, and use thereof. Since these propylene-1-butene copolymers have high hardness, when using them for modification of polypropylene, the surface tackiness of the molded article is inhibited and the heat sealability and impact resistance are improved, but the flexibility, tensile elongation characteristics and scratch resistance are not improved.

Japanese Patent Kokai Publication No. 50-38787 discloses that an amorphous propylene-1-butene copolymer can be obtained by using a titanium trichloride catalyst at 140 to 250° C. When using such a copolymer for modification of polypropylene, the flexibility, tensile elongation characteristics, scratch resistance and transparency are improved, but the properties such as flexibility, tensile elongation characteristics, scratch resistance and transparency are improved only some extent. These properties could be well improved by using much amount of propylene-1-butene copolymer, but properties such as strength and heat resistance become worse. Because the said propylene-1-butene copolymer has the heterogeneity of composition distribution and molecular weight distribution and has the significant amount of crystalline property derived from said heterogeneity, flexibility, tensile elongation characteristics, scratch resistance and transparency are improved, but strength and heat resistance are not sufficiently improved.

As the polypropylene thermoplastic resin composition containing the propylene-1-butene copolymer, for example, a polypropylene thermoplastic resin composition containing a propylene-1-butene copolymer having the crystallizability is disclosed in Japanese Patent Kokai Publication No. 8-12719. Furthermore, a polypropylene thermoplastic resin composition containing a propylene-1-butene copolymer having the crystallinity of 10to 30% is disclosed in Japanese Patent Kokai Publication No. 7-42367. However, these propylene-1-butene copolymers have high hardness and the flexibility imparting effect was not recognized in the polypropylene thermoplastic composition containing these propylene-1-butene copolymer.

SUMMARY OF THE INVENTION

The present inventors have intensively studied about the propylene-1-butene copolymer, which does not cause the problem as described above. As a result, the present inventors have found a novel propylene-1-butene copolymer having a specific Shore A-scale hardness and a specific intrinsic viscosity $[\eta]$ and having neither of a crystalline melting peak and a crystallization peak in case of measuring by a differential scanning calorimeter (DSC), and found that a thermoplastic resin composition having excellent flexibility, tensile elongation characteristics, scratch resistance and transparency can be obtained when the copolymer is mixed with a resin such as polypropylene etc., and also found that a polyolefin material using propylene-1-butene copolymer having a specific Shore A-scale hardness and a specific intrinsic viscosity $[\eta]$ and having neither of a crystalline melting peak and a crystallization peak in case of measuring by a differential scanning calorimeter (DSC) as a modifier is superior in flexibility, tensile elongation characteristics, scratch resistance and transparency etc. Thus, the present invention has been accomplished.

That is, the present invention provides a propylene-1-butene copolymer wherein a Shore A-scale hardness measured according to ASTM D2240 is not more than 70 and an intrinsic viscosity $[\eta]$ measured in axylene solvent at the temperature of 70° C. is not less than 0.3 and copolymer has neither of a crystalline melting peak and a crystallization peak in case of measuring by a differential scanning calorimeter (DSC).

The present invention also provides a thermoplastic resin composition comprising 3 to 95% by weight of said propylene-1-butene copolymer and 97 to 5% by weight of a polyolefin resin.

DETAILED DESCRIPTION OF THE INVENTION

Regarding the propylene-1-butene copolymer of the present invention, the Shore A-scale hardness measured according to ASTM D2240 is not more than 70, preferably not more than 60. When the hardness is too high, the resulting thermoplastic resin composition is inferior in flexibility.

Regarding the propylene-1-butene copolymer of the present invention, the intrinsic viscosity $[\eta]$ measured in a xylene solvent at the temperature of 70° C. is not less than 0.3, preferably not less than 0.5. When the intrinsic viscosity is too low, the resulting thermoplastic resin composition is inferior in tensile elongation characteristics.

The measurement of the intrinsic viscosity $[\eta]$ is conducted in xylene at 70° C., using an Ubbelloide viscometer. A sample (300 mg) is dissolved in 100 ml of xylene to prepare a solution (3 mg/ml). Furthermore, the solution was diluted in a dilution of 1:2, 1:3 and 1:5 and then measured in a constant-temperature water bath at 70° C.(±0.1° C.), respectively. The measurement was repeated three times at each concentration, and the resulting values are used after averaging.

Regarding the propylene-1-butene copolymer of the present invention, those having neither of a crystalline melting peak and a crystallization peak in case of measuring by a differential scanning calorimeter (DSC) are preferable. When such a condition is not satisfied, the resulting thermoplastic resin composition is inferior in flexibility.

In heating and cooling processes, the measurement is conducted at a rate of 10° C./minute using a differential scanning calorimeter (DSC220C, manufactured by Seiko Denshi Kogyo Co., Ltd.).

As the propylene-1-butene copolymer of the present invention, those having a molecular weight distribution (Mw/Mn) measured by gel permeation chromatography (GPC) of not more than 3 are preferable. When the molecular weight distribution is too wide, the stickiness of the thermoplastic resin composition using the copolymer as a modifier may become larger.

The molecular weight distribution is determined by gel permeation chromatography (GPC) (150C/GPC device, manufactured by Waters Co.). The eluting temperature is 140° C. and Sodex Packed Column A-80M is used as a column and, furthermore, polystyrene (manufactured by Toso Co., molecular weight: 68–8,400,000) is used as a molecular weight standard substance. The resulting weight-average molecular weight (Mw) (in terms of polystyrene), number-average molecular weight (Mn) and ratio (Mw/Mn) are taken as the molecular weight distribution. A measuring sample is prepared by dissolving a polymer (about 5 mg) in 5 ml of o-dichlorobenzene in a concentration of about 1 mg/ml. 400 $\mu$l of the resulting sample solution is injected and the refractive index is detected at a solvent eluting rate of 1.0 ml/min using a refractive index detector.

Flexibility of the thermoplastic resin composition comprising polyolefine resin and propylene-1-butene copolymer could be controlled arbitrarily by changing the addition amount of copolymer of the present invention. However, from the view point of the property balance such as mechanical strength and heat resistance ability, addition of minimum amount of the propylene-1-butene copolymer is preferable. The flexural modulus of the composition comprising homopolypropylene and propylene-1-butene copolymer of the present invention is preferably less than 2500 kgf/cm², more preferably less than 2300 kgf/cm², most preferably less than 2000 kgf/cm² when the composition was obtained by blending homopolypropylene and propylene-1-butene copolymer in the weight ratio of 50/50. When the flexural modulus is out of the above-mentioned range, mechanical strength and heat resistance of the thermoplastic resin may become poor.

In the present invention, propylene-1-butene copolymer satisfied in the following equation is preferably used.

$$U \leq S \times [(T/100) \times V]^2$$

U: the flexural modulus of the thermoplastic resin composition

S: the flexural modulus of the homopolypropylene

T: content of the homopolypropylene in the thermoplastic resin composition (wt %)

V is preferably 1.1, more preferably 1.0, further more preferably 0.9, most preferably 0.8. When the flexural modulus of the thermoplastic resin composition is out of the above-mentioned range, balance of mechanical strength and heat resistance may become worth.

In this case, the propylene-1-butene copolymer satisfied in the following equation is preferably used.

$$W \leq T \times Z$$

T represents content of the homopolypropylene in the thermoplastic resin composition (wt %), W represents scratch depth ($\mu$m), wherein Z is preferably 1.0, more preferably 0.9, further more preferably 0.8, most preferably 0.7. Measurement of scratch depth of the composition A scratch mark was made by scratching a press sheet having a thickness of 2 mm at a fixed rate by a scratching needle with a load of 500 g, using a surface properties measuring device Tribogear (manufactured by Shinto Kagaku Co.). The depth of the scratch mark was measured by a contact type surface roughness meter Surfcom (manufactured by Tokyo Seimitsu Co.) in the order of $\mu$m.

When the scratch depth of the thermoplastic resin is out of the above-mentioned range, balance of mechanical strength and heat resistance may become worth.

The content of 1-butene in the propylene-1-butene copolymer of the present invention is preferably from 0.5 to 90% by mol. more preferably from 1 to 70% by mol. When the content of 1-butene is too small, sufficient improving effect is not obtained sometimes. On the other hand, when the content of 1-butene is too large, the molecular weight of the polymer may be drastically decreased. Also in this case, sufficient improving effect, particularly tensile elongation characteristics of the thermoplastic resin composition, is deteriorated sometimes.

Regarding the propylene-1-butene copolymer of the present invention, the content of a boiling n-heptane-insoluble matter is preferably not more than 5% by weight, more preferably not more than3% by weight. When the content of the insoluble matter is too large, the resulting blend composition is inferior in flexibility sometimes.

Regarding the propylene-1-butene copolymer of the present invention, the content of a boiling methyl acetate-soluble matter is preferably not more than 2% by weight. When the content of the soluble portion is too large, the stickiness of the thermoplastic resin composition using the copolymer as a modifier becomes larger sometimes.

Regarding the propylene-1-butene copolymer, the arrangement of the propylene and/or 1-butene side chain shows preferably an atactic structure. The fact that the orientation of the side chain of propylene and/or 1-butene shows an atactic structure means the case where the orientation of the side chain of the propylene chain in the copolymer shows an atactic structure, the case where the orientation of the side chain of the 1-butene chain in the copolymer shows an atactic structure, or the case where the orientation of the side chain of the propylene/1-butene combined chain in the copolymer shows an atactic structure. The fact that the propylene-1-butene copolymer of the present invention shows an atactic structure can be confirmed, for example, by the followings. That is, when a homopolypropylene is polymerized by using a transition metal complex used in the polymerization of the propylene-1-butene copolymer of the present invention, the resulting homopolypropylene has a structure that a F(1) value, which is defined by the following equation using each signal intensity [mm], [mr] and [rr] belonging to mm, mr and rr of propylenemethyl carbon decided by $^{13}$C NMR spectrum, is from 40 to 60, preferably from 43 to 57, more preferably from 45 to 55.

$$F(1) = 100 \times [mr]/([mm]+[mr]+[rr])$$

In the similar way, it is possible to confirm that the propylene copolymer of the present invention shows an atactic structure by the fact that a value corresponding to F(1), which is determined by each signal intensity belonging to mm, mr and rr of propylenemethyl carbon, branched methylene carbon of 1-butene and branched terminal methyl carbon of 1-butene, is within the above range. When the propylene-1-butene copolymer does not show an atactic structure, the hardness may be high and the resulting thermoplastic resin composition is inferior in flexibility sometimes. Incidentally, belonging of mm, mr and rr signals of propylenemethyl carbon, branched methylene carbon of 1-butene and branched terminal methyl carbon of 1-butene can refers to T. Asakura, Macromolecules, Vol.24, page 2334 (1991) and Shinpan Kobunshi Bunseki Hand Book (1995), issued by Kinokuniya Shoten.

The propylene-1-butene copolymer of the present invention is preferably produced by polymerizing propylene with 1-butene using acatalyst having neither of a crystalline melting peak and a crystallization peak in case of measuring by a differential scanning calorimeter (DSC).

As the catalyst, those represented by the following chemical formula (1):

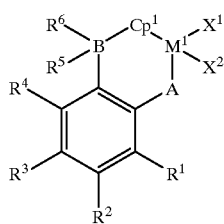

[I]

(wherein $M^1$ represents a transition metal atom of Group 4 of the periodic table of the elements; A represents an atom of Group 16 of the periodic table of the elements; B represents an atom of Group 14 of the periodic table of the elements; $Cp^1$ represents a group having a cyclopentadiene form anion skeleton; $X^1$, $X^2$, $R^1$, $R^2$, $R^3$, $R^4$, $R^5$ and $R^6$ independently represent a hydrogen atom, a halogen atom, an alkyl group having 1 to 20 carbon atoms which may be substituted with a halogen atom, an aralkyl group having 7 to 20 carbon atoms which may be substituted with a halogen atom, an aryl group having 6 to 20 carbon atoms which may be substituted with a halogen atom, a substituted silyl group having 1 to 20 carbon atoms which may be substituted with a halogen atom, an alkoxy group having 1 to 20 carbon atoms which may be substituted with a halogen atom, an aralkyloxy group having 7 to 20 carbon atoms which may be substituted with a halogen atom, an aryloxy group having 6 to 20 carbon atoms which may be substituted with a halogen atom, or a di-substituted amino group having 2 to 20 carbon atoms, provided that $R^1$, $R^2$, $R^3$, $R^4$, $R^5$ and $R^6$ may optionally be combined with each other to form a ring) are preferable.

Specific examples of the transition metal complex represented by the chemical formula [I] include transition metal complexes wherein B in the chemical formula [I] is a carbon atom, such as methylene(cyclopentadienyl)(3,5-dimethyl-2-phenoxy)titanium dichloride, methylene(cyclopentadienyl) (3-tert-butyl-2-phenoxy) titanium dichloride, methylene (cyclopentadienyl) (3-tert-butyl-5-methyl-2-phenoxy) titanium dichloride, methylene(cyclopentadienyl) (3-phenyl-2-phenoxy)titanium dichloride, methylene (cyclopentadienyl) (3-tert-butyldimethylsilyl-5-methyl-2-phenoxy)titanium dichloride, methylene(cyclopentadienyl) (3-trimethylsilyl-5-methyl-2-phenoxy) titanium dichloride, methylene(cyclopentadienyl) (3-tert-butyl-5-methoxy-2-phenoxy)titanium dichloride, methylene(cyclopentadienyl) (3-tert-butyl-5-chloro-2-phenoxy)titanium dichloride, methylene(methylcyclopentadienyl)(3,5-dimethyl-2-phenoxy)titanium dichloride, methylene (methylcyclopentadienyl)(3-tert-butyl-2-phenoxy)titanium dichloride, methylene(methylcyclopentadienyl)(3-tert-butyl-5-methyl-2-phenoxy)titanium dichloride, methylene (methylcyclopentadienyl)(3-phenyl-2-phenoxy)titanium dichloride, methylene(methylcyclopentadienyl)(3-tert-butyldimethylsilyl-5-methyl-2-phenoxy) titanium dichloride, methylene(methylcyclopentadienyl)(3-trimethylsilyl-5-methyl-2-phenoxy)titanium dichloride, methylene(methylcyclopentadienyl)(3-tert-butyl-5-methoxy-2-phenoxy)titanium dichloride, methylene (methylcyclopentadienyl)(3-tert-butyl-5-chloro-2-phenoxy) titanium dichloride, methylene(tert-butylcyclopentadienyl) (3,5-dimethyl-2-phenoxy)titanium dichloride, methylene (tert-butylcyclopentadienyl)(3-tert-butyl-2-phenoxy) titanium dichloride, methylene(tert-butylcyclopentadienyl) (3-tert-butyl-5-methyl-2-phenoxy) titanium dichloride, methylene(tert-butylcyclopentadienyl)(3-phenyl-2-phenoxy)titanium dichloride, methylene(tert-butylcyclopentadienyl)(3-tert-butyldimethylsilyl-5-methyl-2-phenoxy)titanium dichloride, methylene(tert-butylcyclopentadienyl)(3-trimethylsilyl-5-methyl-2-phenoxy'titanium dichloride, methylene(tert-butylcyclopentadienyl)(3-tert-butyl-5-methoxy-2-phenoxy) titanium dichloride, methylene(tert-butylcyclopentadienyl) (3-tert-butyl-5-chloro-2-phenoxy)titanium dichloride, methylene(tetramethylcyclopentadienyl)(3,5-dimethyl-2-phenoxy)titanium dichloride, methylene (tetramethylcyclopentadienyl)(3-tert-butyl-2-phenoxy) titanium dichloride, methylene (tetramethylcyclopentadienyl)(3-tert-butyl-5-methyl-2-phenoxy)titanium dichloride, methylene (tetramethylcyclopentadienyl)(3-phenyl-2-(phenoxy) titanium dichloride, methylene (tetramethylcyclopentadienyl)(3-tert-butyldimethylsilyl-5-methyl-2-phenoxy) titanium dichloride, methylene (tetramethylcyclopentadienyl)(3-trimethylsilyl-5-methyl-2-phenoxy)titanium dichloride, methylene (tetramethylcyclopentadienyl)(3-tert-butyl-5-methoxy-2-phenoxy)titanium dichloride, methylene (tetramethylcyclopentadienyl)(3-tert-butyl-5-chloro-2-phenoxy)titanium dichloride, methylene (trimethylsilylcyclopentadienyl)(3,5-dimethyl-2-phenoxy) titanium dichloride, methylene (trimethylsilylcyclopentadienyl)(3-tert-butyl-2-phenoxy) titanium dichloride, methylene (trimethylsilylcyclopentadienyl)(3-tert-butyl-5-methyl-2-phenoxy) titanium dichloride, methylene (trimethylsilylcyclopentadienyl)(3-phenyl-2-phenoxy) titanium dichloride, methylene (trimethylsilylcyclopentadienyl)(3-tert-butyldimethylsilyl-5-methyl-2-phenoxy)titanium dichloride, methylene (trimethylsilylcyclopentadienyl)(3-trimethylsilyl-5-methyl-2-phenoxy)titanium dichloride, methylene (trimethylsilylcyclopentadienyl)(3-tert-butyl-5-methoxy-2-phenoxy)titanium dichloride, methylene (trimethylsilylcyclopentadienyl)(3-tert-butyl-5-chloro-2-phenoxy)titanium dichloride, methylene(fluorenyl)(3,5-dimethyl-2-phenoxy)titanium dichloride, methylene (fluorenyl)(3-tert-butyl-2-phenoxy)titanium dichloride, methylene(fluorenyl)(3-tert-butyl-5-methyl-2-phenoxy) titanium dichloride, methylene(fluorenyl)(3-phenyl-2-phenoxy)titanium dichloride, methylene(fluorenyl)(3-tert-butyldimethylsilyl-5-methyl-2-phenoxy) titanium dichloride, methylene(fluorenyl)(3-trimethylsilyl-5-methyl-2-phenoxy)titanium dichloride, methylene(fluorenyl)(3-tert-butyl-5-methoxy-2-phenoxy)titanium dichloride, methylene (fluorenyl)(3-tert-butyl-5-chloro-2-phenoxy)titanium dichloride, isopropylidene(cyclopentadienyl)(3,5-dimethyl-2-phenoxy)titanium dichloride, isopropylidene(cyclopentadienyl)(3-tert-butyl-2-phenoxy)titanium dichloride, isopropylidene(cyclopentadienyl)(3-tert-butyl-5-methyl-2-phenoxy)titanium dichloride, isopropylidene(cyclopentadienyl)(3-phenyl-2-phenoxy)titanium dichloride, isopropylidene(cyclopentadienyl)(3-tert-butyldimethylsilyl-5-methyl-2-phenoxy) titanium dichloride, isopropylidene(cyclopentadienyl)(3-trimethylsilyl-5-methyl-2-phenoxy)titanium dichloride, isopropylidene(cyclopentadienyl)(3-tert-butyl-5-methoxy-2-phenoxy)titanium dichloride, isopropylidene(cyclopentadienyl)(3-tert-butyl-5-chloro-2-phenoxy) titanium dichloride, isopropylidene(methylcyclopentadienyl)(3,5-dimethyl-2-phenoxy) titanium dichloride, isopropylidene(methylcyclopentadienyl)(3-tert-butyl-2-phenoxy)titanium dichloride, isopropylidene(methylcyclopentadienyl)(3-tert-butyl-5-methyl-2-phenoxy)titanium dichloride, isopropylidene(methylcyclopentadienyl)(3-phenyl-2-phenoxy)titanium dichloride, isopropylidene(methylcyclopentadienyl)(3-tert-butyldimethylsilyl-5-methyl-2-phenoxy)titanium dichloride, isopropylidene(methylcyclopentadienyl)(3-trimethylsilyl-5-methyl-2-phenoxy)titanium dichloride, isopropylidene(methylcyclopentadienyl)(3-tert-butyl-5-methoxy-2-phenoxy)titanium dichloride, isopropylidene(methylcyclopentadienyl)(3-tert-butyl-5-chloro-2-phenoxy) titanium dichloride, isopropylidene(tert-butylcyclopentadienyl)(3,5-dimethyl-2-phenoxy)titanium dichloride, isopropylidene(tert-butylcyclopentadienyl)(3-tert-butyl-2-phenoxy)titanium dichloride, isopropylidene(tert-butylcyclopentadienyl)(3-tert-butyl-5-methyl-2-phenoxy)titanium dichloride, isopropylidene(tert-butylcyclopentadienyl)(3-phenyl-2-phenoxy)titanium dichloride, isopropylidene(tert-butylcyclopentadienyl)(3-tert-butyldimethylsilyl-5-methyl-2-phenoxy)titanium dichloride, isopropylidene(tert-butylcyclopentadienyl)(3-trimethylsilyl-5-methyl-2-phenoxy)titanium dichloride, isopropylidene(tert-butylcyclopentadienyl)(3-tert-butyl-5-methoxy-2-phenoxy)titanium dichloride, isopropylidene(tert-butylcyclopentadienyl)(3-tert-butyl-5-chloro-2-phenoxy)titanium dichloride, isopropylidene(tetramethylcyclopentadienyl)(3,5-dimethyl-2-phenoxy) titanium dichloride, isopropylidene(tetramethylcyclopentadienyl)(3-tert-butyl-2-phenoxy) titanium dichloride, isopropylidene(tetramethylcyclopentadienyl)(3-tert-butyl-5-methyl-2-phenoxy)titanium dichloride, isopropylidene(tetramethylcyclopentadienyl)(3-phenyl-2-phenoxy) titanium dichloride, isopropylidene(tetramethylcyclopentadienyl)(3-tert-butyldimethylsilyl-5-methyl-2-phenoxy)titanium dichloride, isopropylidene(tetramethylcyclopentadienyl)(3-trimethylsilyl-5-methyl-2-phenoxy)titanium dichloride, isopropylidene(tetramethylcyclopentadienyl)(3-tert-butyl-5-chloro-2-phenoxy)titanium dichloride, isopropylidene(trimethylsilylcyclopentadienyl)(3,5-dimethyl-2-phenoxy) titanium dichloride, isopropylidene(trimethylsilylcyclopentadienyl)(3-tert-butyl-2-phenoxy) titanium dichloride, isopropylidene(trimethylsilylcyclopentadienyl)(3-tert-butyl-5-methyl-2-phenoxy)titanium dichloride, isopropylidene(trimethylsilylcyclopentadienyl)(3-phenyl-2-phenoxy) titanium dichloride, isopropylidene(trimethylsilylcyclopentadienyl)(3-tert-butyldimethylsilyl-5-methyl-2-phenoxy)titanium dichloride, isopropylidene(trimethylsilylcyclopentadienyl)(3-trimethylsilyl-5-methyl-2-phenoxy)titanium dichloride, isopropylidene(trimethylsilylcyclopentadienyl)(3-tert-butyl-5-methoxy-2-phenoxy)titanium dichloride, isopropylidene(trimethylsilylcyclopentadienyl)(3-tert-butyl-5-chloro-2-phenoxy)titanium dichloride, isopropylidene(fluorenyl)(3,5-dimethyl-2-phenoxy)titanium dichloride, isopropylidene(fluorenyl)(3-tert-butyl-2-phenoxy)titanium dichloride, isopropylidene(fluorenyl)(3-tert-butyl-5-methyl-2-phenoxy)titanium dichloride, isopropylidene(fluorenyl)(3-phenyl-2-phenoxy)titanium dichloride, isopropylidene(fluorenyl)(3-tert-butyldimethylsilyl-5-methyl-2-phenoxy) titanium dichloride, isopropylidene(fluorenyl)(3-trimethylsilyl-5-methyl-2-phenoxy)titanium dichloride, isopropylidene(fluorenyl)(3-tert-butyl-5-methoxy-2-phenoxy)titanium dichloride, isopropylidene(fluorenyl)(3-tert-butyl-5-chloro-2-phenoxy)titanium dichloride, diphenylmethylene(cyclopentadienyl)(3,5-dimethyl-2-phenoxy)titanium dichloride, diphenylmethylene (cyclopentadienyl)(3-tert-butyl-2-phenoxy)titanium dichloride, diphenylmethylene (cyclopentadienyl)(3-tert-butyl-5-methyl-2-phenoxy)titanium dichloride, diphenylmethylene (cyclopentadienyl)(3-phenyl-2-phenoxy)titanium dichloride, diphenylmethylene (cyclopentadienyl)(3-tert-butyldimethylsilyl-5-methyl-2-phenoxy)titanium dichloride, diphenylmethylene (cyclopentadienyl)(3-trimethylsilyl-5-methyl-2-phenoxy)titanium dichloride, diphenylmethylene (cyclopentadienyl)(3-tert-butyl-5-methoxy-2-phenoxy)titanium dichloride, diphenylmethylene (cyclopentadienyl)(3-tert-butyl-5-chloro-2-phenoxy) titanium dichloride, diphenylmethylene (methylcyclopentadienyl)(3,5-dimethyl-2-phenoxy) titanium dichloride, diphenylmethylene (methylcyclopentadienyl)(3-tert-butyl-2-phenoxy)titanium dichloride, diphenylmethylene (methylcyclopentadienyl) (3-tert-butyl-5-methyl-2-phenoxy)titanium dichloride, diphenylmethylene (methylcyclopentadienyl) (3-phenyl-2-phenoxy)titanium dichloride, diphenylmethylene (methylcyclopentadienyl) (3-tert-butyldimethylsilyl-5-methyl-2-phenoxy)titanium dichloride, diphenylmethylene (methylcyclopentadienyl) (3-trimethylsilyl-5-methyl-2-phenoxy)titanium dichloride, diphenylmethylene (methylcyclopentadienyl) (3-tert-butyl-5-methoxy-2-phenoxy)titanium dichloride, diphenylmethylene (methylcyclopentadienyl) (3-tert-butyl-5-chloro-2-phenoxy)titanium dichloride, diphenylmethylene (tert-butylcyclopentadienyl) (3,5-dimethyl-2-phenoxy)titanium dichloride, diphenylmethylene (tert-butylcyclopentadienyl) (3-tert-butyl-2-phenoxy)titanium dichloride, diphenylmethylene (tert-butylcyclopentadienyl) (3-tert-butyl-5-methyl-2-phenoxy)titanium dichloride, diphenylmethylene (tert-butylcyclopentadienyl) (3-phenyl-2-phenoxy)titanium dichloride, diphenylmethylene (tert-butylcyclopentadienyl) (3-tert-butyldimethylsilyl-5-methyl-2-phenoxy)titanium dichloride, diphenylmethylene (tert-butylcyclopentadienyl) (3-trimethylsilyl-5-methyl-2-phenoxy)titanium dichloride, diphenylmethylene (tert-butylcyclopentadienyl) (3-tert-butyl-5-methoxy-2-phenoxy)titanium dichloride, diphenylmethylene (tert-butylcyclopentadienyl) (3-tert-butyl-5-chloro-2-phenoxy)titanium dichloride, diphenylmethylene (tetramethylcyclopentadienyl) (3,5-dimethyl-2-phenoxy) titanium dichloride, diphenylmethylene (tetramethylcyclopentadienyl) (3-tert-butyl-2-phenoxy) titanium dichloride, diphenylmethylene (tetramethylcyclopentadienyl) (3-tert-butyl-5-methyl-2-phenoxy)titanium dichloride, diphenylmethylene (tetramethylcyclopentadienyl) (3-phenyl-2-phenoxy) titanium dichloride, diphenylmethylene (tetramethylcyclopentadienyl) (3-tert-butyldimethylsilyl-5-methyl-2-phenoxy) titanium dichloride, diphenylmethylene (tetramethylcyclopentadienyl) (3-trimethylsilyl-5-methyl-2-phenoxy)titanium dichloride, diphenylmethylene (tetramethylcyclopentadienyl) (3-tert-butyl-5-methoxy-2-phenoxy)titanium dichloride, diphenylmethylene (tetramethylcyclopentadienyl) (3-tert-butyl-5-chloro-2-phenoxy)titanium dichloride, diphenylmethylene (trimethylsilylcyclopentadienyl) (3,5-dimethyl-2-phenoxy) titanium dichloride, diphenylmethylene (trimethylsilylcyclopentadienyl) (3-tert-butyl-2-phenoxy) titanium dichloride, diphenylmethylene (trimethylsilylcyclopentadienyl) (3-tert-butyl-5-methyl-2-phenoxy)titanium dichloride, diphenylmethylene (trimethylsilylcyclopentadienyl) (3-phenyl-2-phenoxy) titanium dichloride, diphenylmethylene (trimethylsilylcyclopentadienyl) (3-tert-butyldimethylsilyl-5-methyl -2-phenoxy)titanium dichloride, diphenylmethylene (trimethylsilylcyclopentadienyl) (3-trimethylsilyl-5-methyl-2-phenoxy)titanium dichloride, diphenylmethylene (trimethylsilylcyclopentadienyl) (3-tert-butyl-5-methoxy-2-phenoxy)titanium dichloride, diphenylmethylene (trimethylsilylcyclopentadienyl) (3-tert-butyl-5-chloro-2-phenoxy)titanium dichloride, diphenylmethylene (fluorenyl) (3,5-dimethyl-2-phenoxy) titanium dichloride, diphenylmethylene (fluorenyl) (3-tert-butyl-2-phenoxy) titanium dichloride, diphenylmethylene (fluorenyl) (3-tert-butyl-5-methyl-2-phenoxy)titanium dichloride, diphenylmethylene (fluorenyl) (3-phenyl-2-phenoxy)titanium dichloride, diphenylmethylene (fluorenyl) (3-tert-butyldimethylsilyl-5-methyl-2-phenoxy)titanium dichloride, diphenylmethylene (fluorenyl) (3-trimethylsilyl-5-methyl-2-phenoxy)titanium dichloride, diphenylmethylene (fluorenyl) (3-tert-butyl-5-methoxy-2-phenoxy)titanium dichloride, diphenylmethylene (fluorenyl) (3-tert-butyl-5-chloro-2-phenoxy)titanium dichloride, etc., compounds wherein titanium of these compounds is replaced by zirconium and hafnium, compounds wherein chloride of these compounds is replaced by bromide, iodide, dimethylamide, diethylamide, n-butoxide and isopropoxide, compounds wherein (cyclopentadienyl) of these compounds is replaced by (dimethylcyclopentadienyl), (trimethylcyclopentadienyl), (n-butylcyclopentadienyl), (tert-butyldimethylsilylcyclopentadienyl) and (indenyl), and compounds wherein 3,5-dimethyl-2-phenoxy of these compounds is replaced by 2-phenoxy, 3-methyl-2-phenoxy, 3,5-di-tert-butyl-2-phenoxy, 3-phenyl-5-methyl-2-phenoxy, 3-tert-butyldimethylsilyl-2-phenoxy and 3-trimethylsilyl-2-phenoxy; and transition metal complexes wherein B in the chemical formula [I] is an atom of Group 14 of the periodic table of the elements other than a carbon atom such as dimethylsilyl(cyclopentadienyl)(2-phenoxy)titanium dichloride, dimethylsilyl(cyclopentadienyl)(3-methyl-2-phenoxy)titanium dichloride, dimethylsilyl (cyclopentadienyl)(3,5-dimethyl-2-phenoxy)titanium dichloride, dimethylsilyl(cyclopentadienyl)(3-tert-butyl-2-phenoxy)titanium dichloride, dimethylsilyl (cyclopentadienyl)(3-tert-butyl-5-methyl-2-phenoxy) titanium dichloride, dimethylsilyl(cyclopentadienyl)(3,5-di-tert-butyl-2-phenoxy)titanium dichloride, dimethylsilyl (cyclopentadienyl)(5-methyl-3-phenyl-2-phenoxy)titanium dichloride, dimethylsilyl(cyclopentadienyl)(3-tert-butyldimethylsilyl-5-methyl-2-phenoxy) titanium dichloride, dimethylsilyl(cyclopentadienyl)(5-methyl-3-trimethylsilyl-2-phenoxy)titanium dichloride, dimethylsilyl (cyclopentadienyl)(3-tert-butyl-5-methoxy-2-phenoxy) titanium dichloride, dimethylsilyl(cyclopentadienyl)(3-tert-butyl-5-chloro-2-phenoxy)titanium dichloride, dimethylsilyl(cyclopentadienyl)(3,5-diamyl-2-phenoxy) titanium dichloride, dimethylsilyl(methylcyclopentadienyl) (2-phenoxy)titanium dichloride, dimethylsilyl (methylcyclopentadienyl)(3-methyl-2-phenoxy)titanium dichloride, dimethylsilyl(methylcyclopentadienyl)(3,5-dimethyl-2-phenoxy)titanium dichloride, dimethylsilyl (methylcyclopentadienyl)(3-tert-butyl-2-phenoxy)titanium dichloride, dimethylsilyl(methylcyclopentadienyl)(3-tert-butyl-5-methyl-2-phenoxy)titanium dichloride, dimethylsilyl(methylcyclopentadienyl)(3,,5-di-tert-butyl-2-phenoxy)titanium dichloride, dimethylsilyl (methylcyclopentadienyl)(5-methyl-3-phenyl-2-phenoxy) titanium dichloride, dimethylsilyl(methylcyclopentadienyl) (3-tert-butyldimethylsilyl-5-methyl-2-phenoxy)titanium dichloride, dimethylsilyl(methylcyclopentadienyl)(5-methyl-3-trimethylsilyl- 2-phenoxy)titanium dichloride, dimethylsilyl(methylcyclopentadienyl)(3-tert-butyl-5-methoxy-2-phenoxy)titanium dichloride, dimethylsilyl (methylcyclopentadienyl)(3-tert-butyl-5-chloro-2-phenoxy) titanium dichloride, dimethylsilyl(methylcyclopentadienyl) (3,5-diamyl-2-phenoxy)titanium dichloride, dimethylsilyl (n-butylcyclopentadienyl)(2-phenoxy)titanium dichloride, dimethylsilyl(n-butylcyclopentadienyl)(3-methyl-2-phenoxy)titanium dichloride, dimethylsilylin-butylcyclopentadienyl)(3,5-dimethyl-2-phenoxy)titanium dichloride, dimethylsilyl(n-butylcyclopentadienyl)(3-tert-butyl-2-phenoxy)titanium dichloride, dimethylsilyl(n-butylcyclopentadienyl)(3-tert-butyl-5-methyl-2-phenoxy) titanium dlichloride, dimethylsilyl(n-butylcyclopentadienyl) (3,5-di-tert-butyl-2-phenoxy)titanium dichloride, dimethylsilyl(n-butylcyclopentadienyl)(5-methyl-3-phenyl-2-phenoxy)titanium dichloride, dimethylsilyl(n-butylcyclopentadienyl)(3-tert-butyldimethylsilyl-5-methyl-2-phenoxy)titanium dichloride, dimethylsilyl(n-butylcyclopentadienyl)(5-methyl-3-trimethylsilyl-2-phenoxy)titanium dichloride, dimethylsilyl(n-butylcyclopentadienyl)(3-tert-butyl-5-methoxy-2-phenoxy) titanium dichloride, dimethylsilyl(n-butylcyclopentadienyl) (3-tert-butyl-5-chloro-2-phenoxy)titanium dichloride, dimethylsilyl(n-butylcyclopentadienyl)(3,5-diamyl-2-phenoxy)titanium dichloride, dimethylsilyl(tert-butylcyclopentadienyl)(2-phenoxy)titanium dichloride, dimethylsilyl(tert-butylcyclopentadienyl)(3-methyl-2-phenoxy)titanium dichloride, dimethylsilyl(tert-butylcyclopentadienyl)(3,5-dimethyl-2-phenoxy)titanium dichloride, dimethylsilyl(tert-butylcyclopentadienyl)(3-tert-butyl-2-phenoxy)titanium dichloride, dimethylsilyl(tert-butylcyclopentadienyl)(3-tert-butyl-5-methyl-2-phenoxy) titanium dichloride, dimethylsilyl(tert-butylcyclopentadienyl)(3,5-di-tert-butyl-2-phenoxy) titanium dichloride, dimethylsilyl(tert-3butylcyclopentadienyl)(5-methyl-3-phenyl-2-phenoxy) titanium dichloride, dimethylsilyl(tert-butylcyclopentadienyl)(3-tert-butyldimethylsilyl-5-methyl-2-phenoxy)titanium dichloride, dimethylsilyl(tert-butylcyclopentadienyl)(5-methyl-3-trimethylsilyl-2-phenoxy)titanium dichloride, dimethylsilyl(tert-butylcyclopentadienyl)(3-tert-butyl-5-methoxy-2-phenoxy) titanium dichloride, dimethylsilyl(tert-butylcyclopentadienyl)(3-tert-butyl- 5-chloro-2-phenoxy) titanium dichloride, dimethylsilyl(tert-butylcyclopentadienyl)(3,5-diamyl-2-phenoxy)titanium dichloride, dimethylsilyl(tetramethylcyclopentadienyl)(2-phenoxy)titanium dichloride, dimethylsilyl (tetramethylcyclopentadienyl)(3-methyl-2-phenoxy) titanium dichloride, dimethylsilyl (tetramethylcyclopentadienyl)(3,5-dimethyl-2-phenoxy) titanium dichloride, dimethylsilyl (tetramethylcyclopentadienyl)(3-tert-butyl-2-phenoxy) titanium dichloride, dimethylsilyl (tetramethylcyclopentadienyl)(3-tert-butyl-5-methyl-2-phenoxy)titanium dichloride, dimethylsilyl (tetramethylcyclopentadienyl)(3,5-di-tert-butyl-2-phenoxy) titanium dichloride, dimethylsilyl (tetramethylcyclopentadienyl)(5-methyl-3-phenyl-2-phenoxy)titanium dichloride, dimethylsilyl (tetramethylcyclopentadienyl)(3-tert-butyldimethylsilyl-5-methyl-2-phenoxy)titanium dichloride, dimethylsilyl (tetramethylcyclopentadienyl)(5-methyl-3-trimethylsilyl-2-phenoxy)titanium dichloride, dimethylsilyl (tetramethylcyclopentadienyl)(3-tert-butyl-5-methoxy-2-phenoxy)titanium dichloride, dimethylsilyl (tetramethylcyclopentadienyl)(3-tert-butyl- 5-chloro-2-phenoxy)titanium dichloride, dimethylsilyl (tetramethylcyclopentadienyl)(3,5-diamyl-2-phenoxy) titanium dichloride, dimethylsilyl (trimethylsilylcyclopentadienyl)(2-phenoxy)titanium dichloride, dimethylsilyl(trimethylsilylcyclopentadienyl)(3-methyl-2-phenoxy)titanium dichloride, dimethylsilyl (trimethylsilylcyclopentadienyl)(3,5-dimethyl-2-phenoxy) titanium dichloride, dimethylsilyl (trimethylsilylcyclopentadienyl)(3-tert-butyl-2-phenoxy) titanium dichloride, dimethylsilyl (trimethylsilylcyclopentadienyl)(3-tert-butyl-5-methyl-2-phenoxy)titanium dichloride, dimethylsilyl (trimethylsilylcyclopentadienyl)(3,5-di-tert-butyl-2-phenoxy)titanium dichloride, dimethylsilyl (trimethylsilylcyclopentadienyl)(5-methyl-3-phenyl-2-phenoxy)titanium dichloride, dimethylsilyl (trimethylsilylcyclopentadienyl)(3-tert-butyldimethylsilyl-5-methyl-2-phenoxy)titanium dichloride, dimethylsilyl (trimethylsilylcyclopentadienyl)(5-methyl-3-trimethylsilyl-2-phenoxy)titanium dichloride, dimethylsilyl (trimethylsilylcyclopentadienyl)(3-tert-butyl-5-methoxy-2-phenoxy)titanium dichloride, dimethylsilyl (trimethylsilylcyclopentadienyl)(3-tert-butyl-5-chloro-2-phenoxy)titanium dichloride, dimethylsilyl (trimethylsilylcyclopentadienyl)(3,5-diamyl-2-phenoxy) titanium dlichloride, dimethylsilyl(indenyl)(2-phenoxy) titanium dichloride, dimethylsilyl(indenyl)(3-methyl-2-phenoxy)titanium dichloride, dimethylsilyl(indenyl)(3,5-dimethyl-2-phenoxy)titanium dichloride, dimethylsilyl (indenyl)(3-tert-butyl-2-phenoxy)titanium dichloride, dimethylsilyl(indenyl)(3-tert-butyl-5-methyl-2-phenoxy) titanium dichloride, dimethylsilyl(indenyl)(3,5-di-tert-butyl-2-phenoxy)titanium dichloride, dimethylsilyl(indenyl) (5-methyl-3-phenyl-2-phenoxy)titanium dichloride, dimethylsilyl(indenyl)(3-tert-butyldimethylsilyl-5-methyl-2-phenoxy)titanium dichloride, dimethylsilyl(indenyl)(5-methyl-3-trimethylsilyl-2-phenoxy)titanium dichloride, dimethylsilyl(indenyl)(3-tert-butyl-5-methoxy-2-phenoxy) titanium dichloride, dimethylsilyl(indenyl)(3-tert-butyl-5-chloro-2-phenoxy)titanium dichloride, dimethylsilyl (indenyl)(3,5-diamyl-2-phenoxy)titanium dichloride, dimethylsilyl(fluorenyl)(2-phenoxy)titanium dichloride, dimethylsilyl(fluorenyl)(3-methyl-2-phenoxy)titanium dichloride, dimethylsilyl(fluorenyl)(3,5-dimethyl-2-phenoxy)titanium dichloride, dimethylsilyl(fluorenyl)(3-tert-butyl-2-phenoxy)titanium dichloride, dimethylsilyl (fluorenyl)(3-tert-butyl-5-methyl-2-phenoxy)titanium dichloride, dimethylsilyl(fluorenyl)(3,5-di-tert-butyl-2-phenoxy)titanium dichloride, dimethylsilyl(fluorenyl)(5-methyl-3-phenyl-2-phenoxy)titanium dichloride, dimethylsilyl(fluorenyl)(3-tert-butyldimethylsilyl-5-methyl-2-phenoxy)titanium dichloride, dimethylsilyl (fluorenyl)(5-methyl-3-trimethylsilyl-2-phenoxy)titanium dichloride, dimethylsilyl(fluorenyl)(3-tert-butyl-5-methoxy-2-phenoxy)titanium dichloride, dimethylsilyl(fluorenyl)(3-tert-butyl-5-chloro-2-phenoxy)titanium dichloride, dimethylsilyl(fluorenyl)(3,5-diamyl-2-phenoxy)titanium dichloride, dimethylsilyl(tetramethylcyclopentadienyl)(1-naphtoxy-2-yl)titanium dichloride etc., compounds wherein (cyclopentadienyl) of these compounds is replaced by (dimethylcyclopentadienyl), (trimethylcyclopentadienyl), (ethylcyclopentadienyl), (n-propylcyclopentadienyl), (isopropylcyclopentadienyl), (sec-butylcyclopentadienyl), (isobutylcyclopentadienyl), (tert-butyldimethylsilylcyclopentadienyl), (phenylcyclopentadienyl), (methylindenyl) and (phenylindenyl), compounds wherein 2-phenoxy of these compounds is replaced by 3-phenyl 2-phenoxy, 3-trimethylsilyl-2-phenoxy and 3-tert-butyldimethylsilyl-2-phenoxy, compounds wherein dimethylsilyl of these compounds is replaced by diethylsilyl, diphenylsilyl and dimethoxysilyl, compounds wherein titanium of these compounds is replaced by zirconium and hafnium, and compounds wherein chloride of these compounds is replaced by bromide, iodide, dimethylamide, diethylamide, n-butoxide and isopropoxide. The method of preparing the transition metal complex represented by the chemical formula [I] can refers to Japanese Patent kokai Publication No. 9-87313.

As the transition metal complex of the present invention, the following compound (A) and/or compound (B) can be used by charging in arbitrary order on polymerization, but the reaction product obtained by previously contacting the combination of arbitrary compounds may be used.

Compound (A): organoaluminum compound

As the compound (A), known organoaluminum compounds can be used. Preferable examples include any one of (A1) organoaluminum compound represented by the general formula $E^1_a AlZ_{3-a}$, (A2) cyclic aluminoxane having a structure represented by the general formula $\{-Al(E^2)-O-\}_b$ and (A3) linear aluminoxane having a structure represented by the general formula $E^3\{-Al(E^3)-O-\}_c AlE^3_2$ (wherein $E^1$, $E^2$ and $E^3$ represent a hydrocarbon group having I to 8 carbon atoms, and all of $E^1$, all of $E^2$ and all of $E^3$ may be the same or different; Z represents hydrogen or halogen, and all of Z may be the same or different; a represents a numeral of 0 to 3; b represents an integer of 2 or more; and c represents an integer of 1 or more) or a mixture of two or more kinds of them.

Specific examples of the organoaluminum compound (A1) represented by the general formula $E^1_a AlZ_{3-a}$ include trialkylaluminum such as trimethylaluminum, triethylaluminum, tripropylaluminum, triisobutylaluminum, trihexylaluminum, etc.; dialkylaluminum chloride such as dimethylaluminum chloride, diethylaluminum chloride, dipropylaluminum chloride, diisobuylaluminum chloride, dihexpylaluminum chloride, etc.; alkylaluminum dichloride, such a methylaluminum dichloride, ethylaluminum dichloride, propylaluminum dichloride, isobuthylaluminum dichloride, hexylaluminum dichloride, etc.; and dialkylaluminum hydride such as dimethylaluminum hydride, diethylaluminum hydride, dipropylaluminum hydride, diisobutylaluminum hydride, dihexylaluminum hydride, etc.

Among them, trialkylaluminum is preferable, and triethylaluminum and triisobutylaluminum are more preferable.

Specific examples of $E^2$ and $E^3$ in the cyclic aluminoxane (A2) having a structure represented by the general formula {—Al($E^2$)—O—}$_b$, and linear aluminoxane (A3) having a structure represented by the general formula $E^3${—Al($E^3$)—O—}$_c$ Al$E^3_2$ include alkyl groups such as methyl group, ethyl group, n-propyl group, isopropyl group, n-butyl group, isobutyl group, n-pentyl group, neopentyl group and the like. b is an integer of 2 or more, and c is an integer of 1 or more. Preferably, $E^2$ and $E^3$ are methyl groups or isobutyl groups, b is 2 to 40 and c is 1 to 40.

The above aluminoxane is produced by various methods. The method is not specifically limited, and the aluminoxane may be produced by known methods. For example, it is produced by bringing a solution, prepared by dissolving a trialkylaluminum (e.g. trimethylaluminum, etc.) in a suitable solvent (e.g. benzene, aliphatic hydrocarbon, etc.), into contact with water. There can also be used a method of bringing a trialkylaluminum (e.g. trimethylaluminum, etc.) into contact with a metal salt containing crystallization water (e.g. copper sulfate hydrate, etc.).

Compound (B)

As the compound (B), any one of (B1) boron compound represented by the general formula $BQ^1Q^2Q^3$, (B2) boron compound represented by the general formula $G^+(BQ^1Q^2Q^3Q^4)^-$ and (B3) boron compound represented by the general formula $(L-H)^+(BQ^1Q^2Q^3Q^4)^-$ can be used.

In the boron compound (A1) represented by the general formula $BQ^1Q^2Q^3$, B represents a trivalent boron atom in a valance state; and $Q^1$ to $Q^3$ may be the same or different and represent a halogen atom, a hydrocarbon atom having 1 to 20 carbon atoms, a halogenated hydrocarbon atom having 1 to 20 carbon atoms, a substituted silyl group having 1 to 20 carbon atoms, an alkoxy group having 1 to 20 carbon atoms or an amino group having 2 to 20 carbon atoms. Preferably, $Q^1$ to $Q^3$ represent a halogen atom, a hydrocarbon atom having 1 to 20 carbon atoms or a halogenated hydrocarbon atom having 1 to 20 carbon atoms.

Specific examples of the compound (B1) include tris(pentafluorophenyl)borane, tris(2,3,5,6-tetrafluorophenyl)borane, tris(2,3,4,5-tetrafluorophenyl)borane, tris(3,4,5-trifluorophenyl)borane, tris (2,3,4-trifluorophenyl)borane, phenylbis(pentafluorophenyl)borane, etc. Among them, tris (pentafluorophenyl)borane is most preferable.

In the boron compound (B2) represented by the general formula $G^+(BQ^1Q^2Q^3Q^4)^-$, $G^+$ represents an organic cation; B represents a trivalent boron in the valence state; and $Q^1$ to $Q^4$ are the same as $Q^1$ to $Q^3$ in the above (B1).

In the compound represented by the general formula $G^+(BQ^1Q^2Q^3Q^4)^-$, specific examples of $G^+$ as an inorganic cation include ferrocenium cation, alkyl-substituted ferrocenium cation, silver cation, etc. and specific examples of $G^{30}$ as an organic cation include triphenylmethyl cation, etc. Examples of $(BQ^1Q^2Q^3Q^4)^-$ include tetrakis(pentafluorophenyl)borate, tetrakis(2,3,5,6-tetrafluorophenyl)borate, tetrakis(2,3,4,5-tetrafluorophenyl)borate, tetrakis(3,4,5-trifluorophenyl)borate, tetrakis(2,2,4-trifluorophenyl)borate, phenylbis(pentafluorophenyl)borate, tetrakis(3,5-bistrifluorophenyl)borate and the like.

Examples of the specific combination of them include ferrocenium tetrakis(pentafluorophenyl)borate, 1,1'-dimethylferrocenium tetrakis(pentafluorophenyl)borate, silver tetrakis(pentafluorophenyl)borate, triphenylmethyltetrakis(pentafluorophenyl)borate, triphenylmethyltetrakis(3,5-bistrifluorophenyl)borate and the like. Among them, triphenyltetrakis(pentafluorophenyl) borate is most preferable.

In the boron compound (B3) represented by the general formula $(L-H)^+(BQ^1Q^2Q^3Q^4)^-$, $(L-H)^+$ represents a Brønsted acid; B represents a trivalent boron in the valence state; and $Q^1$ to $Q^4$ are the same as $Q^1$ to $Q^3$ in the above (B1).

In the compound represented by the general formula $(L-H)^+(BQ^1Q^2Q^3Q^4)^-$, specific examples of $(L-H)^+$ as Brønsted acid include trialkyl-substituted ammonium, N,N-dialkylanilinium, dialkylammonium, triarylphosphonium, etc. and specific examples of $(BQ^1Q^2Q^3Q^4)^-$ include the same one as that described above.

Examples of the specific combination of them include triethylammonium tetrakis(pentafluorophenyl)borate, tripropylammonium tetrakis(pentafluorophenyl)borate, tri (n-butyl)ammonium tetrakis(pentafluorophenyl)borate, tri (n-butyl)ammonium tetrakis(3,5-bistrifluorophenyl)borate, N,N-dimethylanilium tetrakis(pentafluorophenyl)borate, N,N-diethylanilium tetrakis(pentafluorophenyl)borate, N,N-2,4,6-pentamethylanilium tetrakis(pentafluorophenyl) borate, N,N-dimethylanilium tetrakis(3,5-bistrifluoromethylphenyl)borate, diisopropylammonium tetrakis(pentafluorophenyl)borate, dicyclohexylammonium tetrakis(pentafluorophenyl)borate, triphenylphosphonium tetrakis(pentafluorophenyl)borate, tri(methylphenyl) phosphonium tetrakis(pentafluorophenyl)borate, tri (dimethylphenyl)phosphonium tetrakis(pentafluorophenyl) borate, etc. Among them, tri(n-butyl)ammonium tetrakis (pentafluoro)borate or N,N-dimethylanilinium tetrakis (pentafluorophenyl)borate is most preferable.

In the present invention, the transition metal complex represented by the chemical formula [I] and compound (A) and/or compound (B) can be used by charging in arbitrary order on polymerization, but the reaction product obtained by previously contacting the combination of arbitrary compounds may be used.

It is preferable that each catalyst is used so that a molar ratio of the compound (A) to the transition metal complex is from 0.1 to 10000, more preferably from 5 to 2000, and a molar ratio of the compound (B) to the transition metal complex is from 0.01 to 100, more preferably from 0.5 to 10. A concentration of each catalyst component used in the state of a solution or the state of being suspended in a solvent is appropriately selected according to the performance of the device used for feeding each catalyst component in a polymerization reactor. It is preferable that each component is generally used so that an amount of the transition metal complex represented by the chemical formula [I] is normally from 0.01 to 500 µmol/g, preferably from 0.05 to 100 µmol/g, more preferably from 0.05 to 50 µmol/g, an amount of the compound (A) is normally from 0.01 to 10000 µmol/g, preferably from 0.1 to 5000 µmol/g, more preferably from 0.1 to 2000 µmol /g, in terms of Al atom, and an amount of the compound (B) is normally from 0.01 to 500 µmol/g, preferably from 0.05 to 200 µmol/g, more preferably from 0.05 to 100 µmol/g.

As the method of producing the propylene-1-butene copolymer, for example, there can be used solvent polymerization using an aliphatic hydrocarbon (e.g. butane, pentane, hexane, heptane, octane, etc.), an aromatic hydrocarbon (e.g. benzene, toluene, etc.) or a halogenated hydrocarbon (e.g. methylene dichloride, etc.) as a solvent, slurry polymerization, vapor phase polymerization in a gaseous monomer, etc. It is also possible to use both continuous polymerization and batch polymerization. The polymerization temperature is within the range from -50 to 200° C., preferably from -20 to 100° C. The polymerization pressure is preferably from normal pressure to 60 kg/cm$^2$G. The polymerization time is appropriately selected according to the kind of the solvent to be used and reaction device, but is within the range from 1 minute to 20 hours. It is also possible to add chain transfer agents such as hydrogen, etc. so as to adjust the molecular weight of the polymer.

The thermoplastic resin composition of the present invention comprises 3 to 95% by weight of the above propylene-1-butene copolymer and 97 to 5% by weight of a polyolefin resin.

Examples of the polyolefin resin include high-density polyethylene, medium-density polyethylene, low-density polyethylene, LLDPE (straight-chain low-density polyethylene), polypropylene resin, poly-4-methyl-pentene-1, etc. Among them, polypropylene resin is preferable.

As the polypropylene resin used in the composition, a crystalline polypropylene resin is preferable, and a homopolymer of propylene or a random or block copolymer of propylene and a small amount of α-olefin is preferable. When the above polypropylene resin is a random copolymer, the copolymerization proportion of the other α-olefin in the copolymer is preferably not more than 10% by weight, more preferably from 0.5 to 7% by weight. When the above polypropylene resin is a block copolymer, the copolymerization proportion of the other α-olefin in the copolymer is preferably from 1 to 40% by weight, more preferably from 1 to 25% by weight, further more preferably from 2 to 20% by weight, most preferably from 3 to 15% by weight. These polypropylene polymers may be those prepared by using two or more polymers in combination thereof. As the index of the crystallizability of polypropylene, for example, melting point, crystalline melting calorie, etc. may be used. The melting point is preferably within the range from 120 to 176° C. and the crystalline melting calorie is preferably within the range from 60 to 120 J/g. When the melting point or melting calorie of the crystal is too low, the resulting material may be inferior in heat resistance.

Examples of the method of producing the polyolefin resin include method of producing a propylene homopolymer, comprising homopolymerizing propylene in a single- or multi-stage according to slurry polymerization, vapor phase polymerization, bulk polymerization, solution polymerization or a combination thereof using a so-called Ziegler-Natta catalyst using a titanium-containing solid transition metal component in combination with an organometal component or a metallocene catalyst composed of a compound having at least one cyclopentadienyl skeleton of a transition metal of Group 4A to Group 6A of the periodic table and a cocatalyst component, or method of producing a propylene/α-olefin copolymer, comprising copolymerizing propylene with α-olefin having 2 or 4 to 12 carbon atoms, preferably ethylene, in a single- or multi-stage. A commercially available product can also be used.

The thermoplastic resin composition of the present invention comprises 3 to 95% by weight of the propylene-1-butene copolymer and 97 to 5% by weight of the polyolefin resin ((A)+(B)=100%). Preferably, the thermoplastic resin composition comprises 10 to 80% by weight of the propylene-1-butene copolymer and 90 to 20% by weight of the polyolefin resin. More preferably, the thermoplastic resin composition comprises 30 to 70% by weight of the propylene-1-butene copolymer and 70 to 30% by weight of the polyolefin resin. When the amount of the propylene-1-butene copolymer is too large (the amount of the polyolefin resin is too small), the fluidity is lowered, which results in poor moldability, strength and heat resistance. On the other hand, when the amount of the propylene-1-butene copolymer is too small (the amount of the polyolefin resin is too large), the flexibility is poor or scratch resistance is poor.

To the thermoplastic resin composition containing the propylene-1-butene copolymer of the present invention, other rubber components such as ethylene-propylene copolymer rubber, ethylene-propylene-nonconjugated diene copolymer rubber, ethylene-1-butene copolymer rubber, polybutadiene, styrene-butadiene block copolymer rubber, styrene-butadiene-styrene block copolymer rubber, styrene-butadiene random copolymer rubber, partially hydrogenated styrene-butadiene-styrene block copolymer rubber, partially hydrogenated styrene-butadiene random copolymer rubber, styrene-isoprene block copolymer rubber, partially hydrogenated styrene-isoprene block copolymer rubber, etc. may be added, if necessary, in addition to the propylene-1-butene copolymer and polyolefin resin as the essential component. The crosslinking reaction can also be conducted by the addition of peroxides, if necessary. Furthermore, antioxidants, heat stabilizers, ultraviolet absorbers, lubricants, antistatic agents, pigments, fillers, frame retardants, etc. may also be added, if necessary.

Examples of the method of obtaining the thermoplastic resin composition containing the propylene-1-butene copolymer of the present invention include method of melt-kneading the respective components, using a twin-screw extruder, a Banbury mixer, etc.

The thermoplastic resin composition containing the propylene-1-butene copolymer of the present invention can be suitably used in appliances, automobile parts, notions, etc. utilizing it's excellent feature. In the automobile parts, it can be suitably used in interior skins such as in-pane, door, pillar, etc. and air-bag cover.

EXAMPLES

The present invention will now be illustrated by means of the following Examples,, which should not be construed as a limitation upon the scope of the invention.

The measuring method of the content of 1-butene in the propylene-1-butene copolymer is as follows.
[Calibration curve]

Each mixture of propylene and 1-butene homopolymers in various mixing ratios was heat-pressed and then molded into a film having a thickness of 0.05 mm. Using an infrared spectrometer, an absorbance ratio of a peak derived from a propylene unit (wavenumber: 1150 cm$^{-1}$) to a peak derived from a 1-butene unit (wavenumber: 770 cm$^{-1}$) was determined and the content of the 1-butene unit in the mixture was plotted versus this absorbance ratio. A regression line was determined from these plots and was taken as a calibration curve. Incidentally, the mixture of the propylene and 1-butene homopolymers was dissolved in toluene and methanol was added, and the resulting precipitate was used after drying.
[Measurement of content of 1-butene]

The propylene-1-butene copolymer was heat-pressed and molded into a film having a thickness of 0.05 mm. Then, an absorbance ratio of a peak derived from a propylene unit to a peak derived from a 1-butene unit was determined and the content of the 1-butene unit in the propylene-1-butene copolymer was calculated by the calibration curve obtained by the above method.

The hardness of the propylene-l-butene copolymer was measured according to ASTM D2240.

In heating and cooling processes, the measurement was conducted at a rate of 10° C./minute using a differential scanning calorimeter (DSC220C, manufactured by Seiko Denshi Kogyo Co.).

The measurement of the intrinsic viscosity [η] is conducted in xylene at 70° C. using an Ubbelloide viscometer. A sample (300 mg) is dissolved in 100 ml of xylene to prepare a solution (3 mg/ml). Furthermore, the solution was diluted in a dilution of 1:2. 1:3 and 1:5 and then measured in a constant- temperature water bath at 70° C.(±0.1° C.), respectively. The measurement was repeated three times at each concentration, and the resulting values are used after averaging.

The molecular weight distribution is determined by gel permeation chromatography (GPC) (150C/GPC device, manufactured by Waters Co.). The eluting temperature is 140° C. and Sodex Packed Column A-80M is used as a column and, furthermore, polystyrene (manufactured by Toso Co., molecular weight: 68–8,400,000) is used as a molecular weight standard substance. The resulting weight-average molecular weight (Mw) (in terms of polystyrene), number-average molecular weight (Mn) and ratio (Mw/Mn) are taken as the molecular weight distribution. A measuring sample is prepared by dissolving a polymer (about 5 mg) in 5 ml of o-dichlorobenzene in a concentration of about 1 mg/ml. 400 μl of the resulting sample solution is injected and the refractive index is detected at a solvent eluting rate of 1.0 ml/min using a refractive index detector.

Using a twin-screw batch type laboplasto-mill (manufactured by Toyo Seiki Co.), the formulation components shown in Table 2 were kneaded at the temperature of 200° C., at a screw rotary speed of 100 rpm for 3 minutes. The composition was pressed at 200° C. to prepare a sheet having a thickness of 2 mm. A test sample was punched out from the press sheet and then measured.

Various characteristics of the propylene-1-butene copolymer compositions described in the Examples and Comparative Examples were measured by the following methods.

(1) Hardness: ASTM D2240
(2) Bending test: JIS K7203
(3) Tensile test: JIS K6301 The test was conducted at a stress rate of 200 (mm/min.) using a No. 3 dumbbell.
(4) Scratch resistance test: A scratch mark was made by scratching a press sheet having a thickness of 2 mm as a sample at a fixed rate by a scratching needle with a load of 500 g, using a surface properties measuring device Tribogear (manufactured by Shinto Kagaku Co.). The depth of the scratch mark was measured by a contact type surface roughness meter Surfcom (manufactured by Tokyo Seimitsu Co.) in the order of μm.
(5) Haze: JIS K7105 A press sheet having a thickness of 2 mm was measured.
(6) Differential scanning calorimeter (DSC): In heating and cooling processes, the measurement was conducted at a rate of 10° C./minute using a differential scanning calorimeter (DSC220C. manufactured by Seiko Denshi Kogyo Co.).

Example 1

After a separable flask reactor having a volume of 2 l was equipped with a stirrer, a thermometer, a dropping funnel and a reflux condenser and evacuated, the atmosphere in the flask was replaced by nitrogen. Toluene (1 liter) was introduced into the flask as a polymerization solvent. Then, propylene (8 NL/min.) and 1-butene (0.5 NL/min.) were continuously fed into the flask, and the solvent temperature was adjusted to 30° C. After triisobutylaluminum (hereinafter abbreviated to TIBA) (1.25 mmol) was added in a polymerization vessel, Dimethylsilyl(tetramethylcyclopentadienyl)(3-t-butyl-5-methyl-2-phenoxy) titanium dichloride (0.005 mmol) was added in the polymerization vessel as a polymerization catalyst. Fifteen seconds after the addition, triphenylmethyltetrakis (pentafluorophenyl)borate (0.025 mmol) was added in the polymerization vessel and the polymerization was initiated. As a result of the polymerization for 30 minutes, 155.8 g of a propylene-1-butene copolymer was obtained.

Examples 2 to 16 and Comparative Examples 1 to 10

According to substantially the same manner as that described in Example 1 except for changing to the amount of the monomer and amount of the catalyst shown in Tables, a copolymer was obtained. And a polypropylene composition was obtained by blending according to Tables. The detailed results are summarized in Tables.

As is apparent from the results, the polypropylene compositions of Examples 9 to 16 using the copolymers of Examples 1 to 8 satisfying the conditions of the present invention have low flexural modulus, high tensile elongation and excellent scratch resistance and transparency in comparison with the polypropylene composition of Comparative Example 6 to 10 using the copolymer of Comparative Example 1 to 5.

TABLE 1

Propylene-1-butene copolymer

| | | Example | | | | | | | |
|---|---|---|---|---|---|---|---|---|---|
| | | 1 A-1 PBR | 2 A-2 PBR | 3 A-3 PBR | 4 A-4 PBR | 5 A-5 PBR | 6 A-6 PBR | 7 A-7 PBR | 8 A-8 PBR |
| Polymerization temperature | ° C. | 30 | 30 | 30 | 30 | 30 | 30 | 30 | 30 |
| Polymerization time | min | 30 | 30 | 30 | 30 | 30 | 30 | 30 | 30 |
| Propylene gas | L/min | 8 | 6 | 8 | 4 | 8 | 8 | 8 | 8 |
| 1-Butene gas | L/min | 0.1 | 0.1 | 0.2 | 0.1 | 0.3 | 0.5 | 0.5 | 0.5 |
| Hydrogen gas | L/min | 0 | 0 | 0 | 0 | 0 | 0 | 0 | 3 |
| *1 (a) | mmol | 1.25 | 1.25 | 1.25 | 1.25 | 1.25 | 1.25 | 1.25 | 1.25 |
| *2 (b) | mmol | 0.025 | 0.025 | 0.025 | 0.025 | 0.025 | 0.025 | 0.0075 | 0.025 |
| *3 (c) | mmol | 0.005 | 0005 | 0.005 | 0.005 | 0.005 | 0.005 | 0.0015 | 0.005 |
| Propylene content | mol % | >99.5 | 98 | 93 | 92 | 88 | 81 | 57 | 81 |
| 1-Butene content | mol % | <0.5 | 2 | 7 | 8 | 12 | 19 | 43 | 19 |
| Hardness: | | | | | | | | | |
| Shore A-scale | | 45 | 46 | 45 | 45 | 45 | 34 | 24 | 13 |
| Shore D-scale | | 12 | 13 | 12 | 12 | 13 | 8 | 5 | — |
| Intrinsic viscosity [η] | dl/g | 2.1 | 1.7 | 1.5 | 1.4 | 1.3 | 1.0 | 0.5 | 0.4 |
| Tg | ° C. | −7.4 | −7.2 | −7.7 | −7.9 | −8.2 | −9.3 | −14.2 | −8.5 |
| Crystallizability | | No | No | No | No | No | No | No | No |

TABLE 1-continued

Propylene-1-butene copolymer

| | | Example | | | | | | | |
|---|---|---|---|---|---|---|---|---|---|
| | | 1<br>A-1<br>PBR | 2<br>A-2<br>PBR | 3<br>A-3<br>PBR | 4<br>A-4<br>PBR | 5<br>A-5<br>PBR | 6<br>A-6<br>PBR | 7<br>A-7<br>PBR | 8<br>A-8<br>PBR |
| Crystalline melting point | °C. | No | No | No | No | No | No | No | No |
| Crystalline melting calorie | mj/mg | No | No | No | No | No | No | No | No |
| GPC Mw/Mn | | 2.5 | 2.4 | 2.2 | 2.2 | 2.2 | 2.1 | 2.1 | 2.7 |

TABLE 2

Propylene-1-butene copolymer

| | | Comaprative example | | | | |
|---|---|---|---|---|---|---|
| | | 1<br>A-9<br>PB | 2<br>A-10<br>PBR | 3<br>A-11<br>PBR | 4<br>A-12<br>PBR | 5<br>A-13<br>PP |
| Polymerization temperature | °C. | — | — | 30 | 50 | 30 |
| Polymerization time | min | — | — | 30 | 30 | 30 |
| Propylene gas | L/min | — | — | 8 | 8 | 8 |
| 1-Butene gas | L/min | — | — | 1.0 | 0.5 | 0 |
| Hydrogen gas | L/min | — | — | 0 | 3 | 0.7 |
| *1 (a) | mmol | — | — | 1.25 | 1.25 | 0.625 |
| *2 (b) | mmol | — | — | 0.01 | 0.025 | 0.0125 |
| *3 (c) | mmol | — | — | — | 0.005 | 0.0025 |
| *4 (d) | mmol | — | — | 0.02 | — | — |
| Propylene content | mol % | 24 | 71 | 70 | 79 | 100 |
| 1-Butene content | mol % | 76 | 29 | 30 | 21 | 0 |
| Hardness: | | | | | | |
| Shore A-scale | | 94 | 39 | 93 | <10 | 40 |
| Shore D-scale | | 47 | 12 | 52 | — | — |
| Intrinsic viscosity [η] | dl/g | 1.4 | 0.4 | 1.8 | 0.2 | 1.1 |
| Tg | °C. | −27 | −18.4 | −12.1 | −10.3 | −6.5 |
| Crystallizability | | Yes | Yes | Yes | No | No |
| Crystalline melting point | °C. | 75 | 49.7 | 76.2 | No | No |
| Crystalline melting calorie | mj/mg | 27 | 4 | 30 | No | No |
| GPC Mw/Mn | | 3.7 | 8.8 | 2.2 | 2.3 | 3.2 |

1 (a): Triisobutylaluminum
*2 (b): Triphenylmethyltetrakis (pentafluorophenyl)borate
*3 (c): Dimethylsilyl (tetramethylcyclopentadienyl) (3-t-butyl-5-methyl-2-phenoxy) titanium dichloride
*4 (d): A-8PB: Polybutene M2481 (manufactured by Mitsui Petrochemical Co.), MI at 230° C. under load of 2.16 Kg: 4.0
A-9PBR: Propylene-1-butene rubber UBETAC APAO UT2780 (manufactued by UBE REXENE Co.)

A-1 to A-8, A-9 to A-12 PBR are propylene-1-butene rubbers.

TABLE 3

Propylene-1-butene copolymer composition

| | | Example | | | | | | | |
|---|---|---|---|---|---|---|---|---|---|
| Copolymer | Unit | 9 | 10 | 11 | 12 | 13 | 14 | 15 | 16 |
| A-1 | wt % | 50 | | | | | | | |
| A-2 | wt % | | 50 | | | | | | |
| A-3 | wt % | | | 50 | | | | | |
| A-4 | wt % | | | | 50 | | | | |
| A-5 | wt % | | | | | 50 | | | |
| A-6 | wt % | | | | | | 50 | | |

TABLE 3-continued

Propylene-1-butene copolymer composition

| Copolymer | Unit | Example 9 | 10 | 11 | 12 | 13 | 14 | 15 | 16 |
|---|---|---|---|---|---|---|---|---|---|
| A-7 | wt % | | | | | | | 50 | |
| A-8 | wt % | | | | | | | | 50 |
| B-1 | wt % | 50 | 50 | 50 | 50 | 50 | 50 | 50 | 50 |
| Hardness: | | | | | | | | | |
| Shore A-scale | | 93 | 93 | 93 | 93 | 93 | 93 | 93 | — |
| Shore D-scale | | 52 | 53 | 52 | 52 | 53 | 52 | 52 | — |
| Flexural modulus | Kgf/cm$^2$ | 1350 | 1330 | 1340 | 1450 | 1440 | 1420 | 1420 | 1400 |
| Tensile strength | Kgf/cm$^2$ | 106 | 122 | 129 | 121 | 124 | 111 | 101 | 108 |
| Tensile elongation | % | 870 | 1000 | 980 | 900 | 960 | 860 | 680 | 700 |
| Scratch depth (500 g load) | μm | 22 | 19 | 27 | 25 | 21 | 35 | 46 | 64 |
| Haze (2 mmt) | % | 80 | 69 | 66 | 68 | 70 | 70 | 67 | 70 |
| PP crystalline melting calorie | mj/mg | 56 | 55 | 57 | 58 | 54 | 54 | 55 | 44 |

TABLE 4

Propylene-1-butene copolymer composition

| Copolymer | Unit | Example 6 | 7 | 8 | 9 | 10 |
|---|---|---|---|---|---|---|
| A-9 | wt % | 50 | | | | |
| A-10 | wt % | | 50 | | | |
| A-11 | wt % | | | 50 | | |
| A-12 | wt % | | | | 50 | |
| A-13 | wt % | | | | | 50 |
| B-1 | wt % | 50 | 50 | 50 | 63 | 50 |
| Hardness: | | | | | | |
| Shore A-scale | | 97 | 92 | — | — | 92 |
| Shore D-scale | | 63 | 53 | — | — | 51 |
| Flexural modulus | Kgf/cm$^2$ | 6740 | 2560 | 6800 | 2720 | 1610 |
| Tensile strength | Kgf/cm$^2$ | 258 | 152 | 300 | 109 | 76 |
| Tensile elongation | % | 400 | 720 | 680 | 470 | 393 |
| Scratch depth (500 g load) | μm | 83 | 75 | 48 | 79 | 33 |
| Haze (2 mmt) | % | 86 | 71 | 87 | 79 | 84 |
| PP crystalline melting calorie | mj/mg | 49+ 8.8* | 56 | 38 | 53 | 44 |

B-1: Homopolypropylene wherein MI at 230° C. under a load of 2.16 Kg is 14 (g/10 min.)
*: Melting calorie peak which arises between Tm of polypropylene and that of polybutene

What is claimed is:

1. A propylene-1-butene copolymer having a Shore A-scale hardness measured according to ASTM D2240 of not more than 70, an intrinsic viscosity [η] measured in a xylene solvent at a temperature 70° C. of not less than 0.3 dl/g, a molecular weight distribution Mw/Mn as measured by gel permeation chromatography (GPC) of not more than 3, and no crystal and melting peak and no crystallization peak according to a differential scanning calorimeter (DSC) measurement which is conducted at a rate of 10° C./min.

2. The propylene-1-butene copolymer according to claim 1, wherein the Shore A-scale hardness measured according to ASTM D2240 is not more than 60.

3. The propylene-1-butene copolymer according to claim 1, wherein the intrinsic viscosity [η] measured in a xylene solvent at the temperature of 70° C.: is not less than 0.5.

4. The propylene-1-butene copolymer according to claim 1, wherein the flexural modulus of the thermoplastic resin composition comprising 50% weight of the propylene-1-butene copolymer and 50% weight of the homopolypropylene is less than 2500 kgf/cm$^2$.

5. The propylene-1-butene copolymer according to claim 1, wherein the content of 1-butene is from 0.5 to 90% by mol.

6. The propylene-1-butene copolymer according to claim 1, wherein the content of 1-butene is from 1 to 70% by mol.

7. The propylene-1-butene copolymer according to claim 1, wherein the content of a boiling n-heptane-insoluble component is not more than 5% by weight.

8. The propylene-1-butene copolymer according to claim 1, wherein the content of a boiling n-heptane-insoluble component is not more than 3% by weight.

9. The propylene-1-butene copolymer according to claim 1, wherein the content of a boiling methyl acetate-soluble component is not more than 2% by weight.

10. The propylene-1-butene copolymer according to claim 1, wherein said copolymer is obtained by copolymerizing propylene with 1-butene using a catalyst which can produce polypropylene and has neither of a crystalline melting peak and a crystallization peak in case of measuring by a differential scanning calorimeter (DSC).

11. The propylene-1-butene copolymer according to claim 1, wherein the catalyst is represented by the following chemical formula (1):

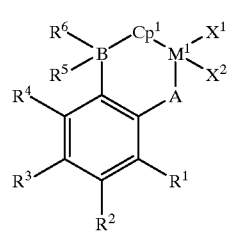

[I]

wherein $M^1$ represents a transition metal atom of Group 4 of the periodic table of the elements; A represents an atom of Group 16 of the periodic table of the elements; B represents an atom Group 14 of the periodic table of the elements; $Cp^1$ represents a group having a cyclopentadiene form anion skeleton; $X^1$, $X^2$, $R^1$, $R^2$, $R^3$, $R^4$, $R^5$ and $R^6$ independently represent a hydrogen atom, a halogen atom, an alkyl group having 1 to 20 carbon atoms which may be substituted with a halogen atom, an aralkyl group having 7 to 20 carbon atoms which may be substituted with a halogen atom, an aryl group having 6 to 20 carbon atoms which may be substituted with a halogen atom, a substituted silyl group having 1 to 20 carbon atoms which may be substituted with a halogen atom, an alkoxy group having 1 to 20 carbon atoms which may be substituted with a halogen atom, an aralkyloxy group having 7 to 20 carbon atoms which may be substituted with a halogen atom, an aryloxy group having 6 to 20 carbon atoms which may be substituted with a halogen atom, or a di-substituted amino group having 2 to 20 carbon atoms, $R^1$, $R^2$, $R^3$, $R^4$, $R^5$ and $R^6$ may optionally be combined with each other to form a ring.

12. A thermoplastic resin composition comprising 3 to 95% by weight of the propylene-1-butene copolymer according claim 1 and 97 to 5% by weight of a polyolefin resin.

13. A thermoplastic resin composition comprising 10 to 80% by weight of the propylene-1-butene copolymer according to claim 1 and 90 to 20% by weight of a polyolefin resin.

14. The thermoplastic resin composition according to claim 12 or 13, wherein the polyolefin resin is a crystalline polypropylene resin.

* * * * *